Patented Oct. 10, 1939

2,175,220

UNITED STATES PATENT OFFICE 2,175,220

ANDROSTENDIONE AND A METHOD OF PRODUCING THE SAME

Walter Schoeller, Berlin-Westend, and Arthur Serini and Willy Logemann, Berlin, Germany, assignors to Schering Aktiengesellschaft, a corporation of Germany No Drawing. Application September 28, 1935, Serial No. 42,572. In Germany October 4, 1934

26 Claims. (Cl. 260—397)

This invention relates to an unsaturated diketone of the cyclopentano polyhydro phenanthrene series, and more particularly to androstendione and a method of producing the same.

One object of this invention is the production of the diketone androstendione from the corresponding hydroxy ketones androstenolones by subjecting the latter to the action of suitable oxidizing or dehydrogenating agents.

Another object of this invention is the transformation of the hydroxy ketone dehydroandrosterone into said diketone androstendione.

Said starting materials, the androstenolones correspond to the general formula $C_{19}H_{28}O_2$ and the structural formula

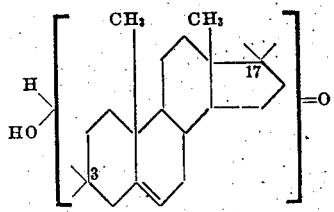

wherein the =O-group may be at the C-atom 3 or 17 and the hydroxy group at the C-atom 17 or 3 respectively. These compounds have been isolated from natural sources such as testicles or the urine of male individuals, or have been produced synthetically, for instance, by oxidizing sterols, or the like methods. They show a remarkable physiological activity in the capon comb test as well as in the vesicular gland test.

The new product androstendione, obtained according to this invention corresponds to the general formula $C_{19}H_{26}O_2$ and the structural formula

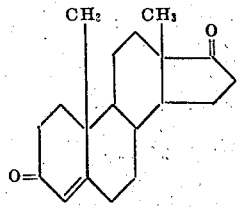

It is known also as $\Delta^{4,5}$-etiocholene-dione (3,17). Since this diketone has a physiological activity that is considerably higher than, for instance, that of dehydroandrosterone, i. e. the androstenol-(3)-one-(17), the process described and claimed hereinafter makes it possible to transform this latter natural product into a more active synthetic compound.

The oxidation process may be carried out by treating the androstenolones with oxidising agents which do not attack the double bond or by first protecting the double bond, for example, by adding on halogen or halogen hydride, subsequently oxidising to the ketone and reestablishing the double bond in the oxidation product obtained. The treatment with halogen or halogen hydride yields a saturated intermediate compound having substituents in the 5 and 6 positions of which one is halogen and the other halogen or hydrogen.

The following examples serve to illustrate this invention without, however, limiting the same to them:

Example 1

2 grams of androstenol-(3)-one-(17) are dissolved in 100 cc. of glacial acetic acid. To this solution is added at room temperature a solution of 1.1 grams of bromine in 30 cc. of glacial acetic acid while stirring. As soon as the solution has become colorless, 1.0 gram of chromic acid anhydride in 10 cc. of 80% acetic acid are gradually added thereto. The reaction mixture is allowed to stand for 1 to 2 days. Thereupon 5 grams of zinc dust are added, and the mixture is vigorously stirred for 12 hours at room temperature. The solution is filtered, the filtrate poured into 1 to 2 liters of water, neutralized with dilute sodium hydroxide solution in the cold, extracted with ether, the ethereal solution is washed with dilute sodium hydroxide solution and water, and the ether is evaporated. The residue is recrystallized from dilute alcohol, acetic acid ethyl ester, or benzine whereby crystals of the melting point 169–170° C. are obtained.

Example 2

1 gram of androstenolone is dissolved in 50 cc. of carbon tetrachloride and to this solution a solution of 0.25 gram of chlorine in 25 cc. of carbon tetrachloride is added drop by drop at room temperature. Thereupon the carbon tetrachloride is evaporated in a vacuum, the residue is dissolved in 100 cc. of glacial acetic acid and oxidized by adding a solution of 0.5 gram of chromic acid anhydride in 10 cc. of 75% acetic acid. The working up and dechlorination of the oxidation product is carried out in the same manner as described in Example 1.

Example 3

2 grams of androstenolone are dissolved in 100 cc. of a mixture of equal parts of ether and absolute alcohol. Into this solution 40 grams of dry hydrochloric acid gas are introduced and the reaction mixture is allowed to stand for 1 to 2 days in the cold. Thereupon the ether is evaporated at a very low temperature in a vacuum, the precipitated androstenolone hydrochloride is filtered off by suction, dissolved in glacial acetic acid and oxidized with 0.6 gram of chromic acid anhydride in glacial acetic acid. After oxidation most of the acetic acid is evaporated in a high vacuum whereby the temperature is kept as low as possible. The residue is heated with pyridine under reflux to boiling in order to split off hydrochloric acid. The reaction solution is then poured into dilute sulfuric acid, extracted with ether and the ethereal solution is washed with dilute alkali lye and water. After drying, it is evaporated to dryness, the residue is purified by recrystallisation and yields the same androstendione as described in the preceding examples.

*Example 4*

The brominated androstenolone as obtained, for instance, according to the method described in Example 1, is dissolved in 100 cc. of benzene. The benzene solution is shaken with 40 cc. of 4% potassium permanganate solution in the presence of 40 cc. of 10% sulfuric acid, for 8 hours in the cold. Thereupon the manganese dioxide formed is brought into solution by means of sulfur dioxide, the benzene layer is separated from the aqueous layer and evaporated to dryness in a vacuum. The oxidation product is then debrominated and isolated as described in Example 1.

*Example 5*

1 gram of androstenolone is fused in a wide-mouthed test tube and heated at an outside temperature of about 280° C. 5 grams of finely powdered copper oxide are introduced into the fused mass in several portions. After further heating for 1 hour it is cooled and the reaction product extracted with ether, the ethereal solution is shaken with animal charcoal and the ether evaporated. From the residue the androstendione, as described in the preceding examples, is isolated.

Of course, many changes and variations may be made in the reaction conditions described in the above given examples. Thus, for instance, the halogenation of the starting materials may not only be carried out in glacial acetic acid or in carbon tetrachloride, but also other organic solvents which are not substantially affected by halogen may be used likewise, such as chloroform and the like.

The splitting off of hydrogen halide or halogen in order to establish a double bond in the ring system is achieved not only by those reagents mentioned in the examples, as by treatment with pyridine bases or with zinc dust respectively, but also other reagents may be used such as treatment with alkaline agents or the like, i. e. methods as they are described, for instance, by Houben "Die Methoden der organischen Chemie", 2d edition, vol. 2, pages 744–746 (1922).

The oxidation of the androstenolones may not only be carried out by means of chromic acid anhydride or potassium permanganate but also other oxidizing agents capable of transforming a hydroxy group into a keto group, such as bichromates in acid solution, alkali and alkaline earth permanganates, metal oxides and the like.

The separation and isolation of the halogenated intermediate compounds and the unsaturated end product is not only made in the manner described in the examples for instance, by extracting the reaction mixtures with suitable solvents and evaporating the latter, or by precipitating the compounds formed from their solutions by means of water or other organic solvents wherein they are insoluble, while the by-products and impurities remain dissolved therein, but one may also use other methods, for instance, by making use of the formation of insoluble or difficultly soluble condensation products as with typical ketone reagents and the like.

The purification of said intermediate and end products may be done by fractional and/or repeated crystallisation, distillation, sublimation and the like.

Of course, the amounts of the various agents and the type and the amount of the solvents used in carrying out this invention, the temperatures employed and other reaction conditions may be varied within the limits obvious to those skilled in the art. Hence, many other changes and variations may be made in accordance with the principles set forth herein and in the claims annexed hereto.

What we claim is:

1. A method for producing an androstendione of the general formula $C_{19}H_{26}O_2$, comprising oxidizing an androstenolone of the general formula $C_{19}H_{28}O_2$ with an agent capable of converting a secondary alcohol group into a keto group.

2. A method for producing an androstendione of the general formula $C_{19}H_{26}O_2$, comprising oxidizing an androstenolone of the general formula $C_{19}H_{28}O_2$ with an agent capable of converting a secondary alcohol group into a keto group, and isolating the diketone obtained.

3. A method according to claim 2, wherein an oxidizing agent is used which does not attack the double bond in the molecule of the starting material.

4. A method according to claim 2, including the step of adding a member of the group consisting of halogen and halogen hydride, at the double bond, to protect the same during oxidation against the action of the oxidizing agent.

5. A method according to claim 2, wherein the double bond is protected during oxidation by intermediate addition of halogen to the double bond.

6. A method according to claim 2, wherein the double bond is protected during oxidation by intermediate addition of halogen hydride to the double bond.

7. A method according to claim 2, wherein as oxidizing agent chromic acid anhydride is used.

8. A method for producing an androstendione of the general formula $C_{19}H_{26}O_2$, comprising oxidizing dehydroandrosterone of the general formula $C_{19}H_{28}O_2$ and the structural formula

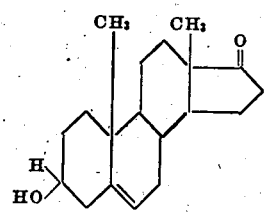

with an agent capable of converting a secondary alcohol group into a keto group, and isolating the diketone obtained.

9. A method for producing an androstendione of the general formula $C_{19}H_{26}O_2$, comprising treating an androstenolone of the general formula $C_{19}H_{28}O_2$ with a member of the group consisting of halogen and halogen hydride, so as to saturate the double bond in the molecule of said starting material, oxidizing the halogenated compound obtained with an agent capable of converting a secondary alcohol group into a keto group, reacting the oxidized product with an agent capable of splitting off said member and thereby reestablishing the double bond in the oxidized compound, and isolating the unsaturated diketone obtained.

10. A method according to claim 9, in which halogen is added at the double bond by treating a solution of the unsaturated androstenolone with halogen.

11. A method according to claim 9, in which halogen hydride is added at the double bond by treating a solution of the unsaturated androstenolone with halogen hydride.

12. A method according to claim 9, in which halogen is added at the double bond by treating a solution of the unsaturated androstenolone with halogen, and wherein the splitting off of the halogen added is effected by reacting the halogenated compound with zinc.

13. A method according to claim 9, in which a hexavalent chromium compound is used as oxidizing agent which is capable of effecting the aforementioned conversion.

14. A halogenated androstenone compound of the general formula $C_{19}H_{26}OXYZ$ corresponding to the structural formula

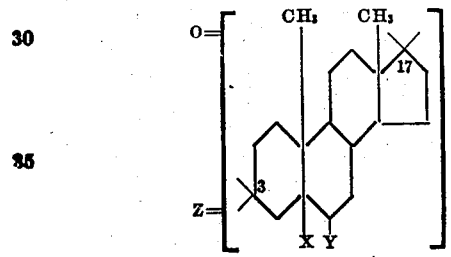

at least one of the X and Y groups being halogen and the other a member of the group consisting of halogen and hydrogen, and Z is a divalent group selected from the crops consisting of ketonic O and

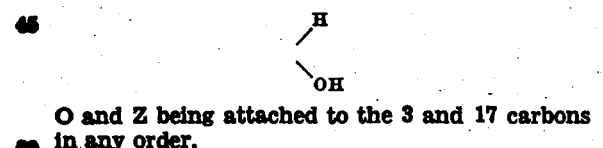

O and Z being attached to the 3 and 17 carbons in any order.

15. A halogenated androstendione of the general formula $C_{19}H_{26}O_2XY$ and the structural formula

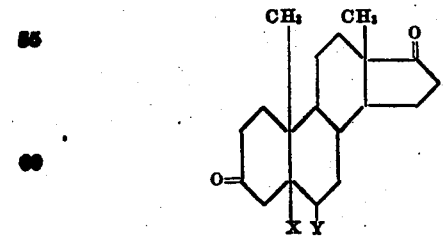

wherein at least one of the X and Y groups is halogen and the other a member of the group consisting of halogen and hydrogen.

16. A halogenated androstenol-(3)-one-(17) of the general formula $C_{19}H_{28}O_2XY$ and the structural formula

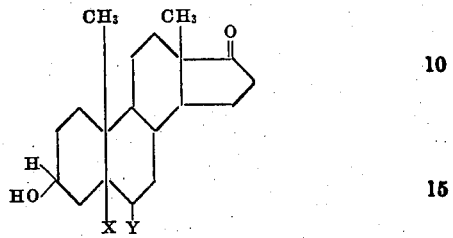

wherein at least one of the X and Y groups is halogen and the other a member of the group consisting of halogen and hydrogen.

17. $\Delta^{4,5}$-etiocholene-dione-(3,17).

18. A process for producing $\Delta^{4,5}$-etiocholene-dione-(3,17) which comprises halogenating the double bond of dehydro-androsterone, subjecting the halogenated compound to the action of chromium trioxide whereby the hydroxyl group of said compound is converted to a keto group, treating the oxidized halogenated compound with zinc dust to remove the halogen therefrom, and separating the $\Delta^{4,5}$-etiocholene-dione-(3,17) from the reaction product.

19. The dihalide of an androstenolone.

20. The dibromide of androstenol-(3)-one-(17) of the general formula $C_{19}H_{28}O_2Br_2$.

21. A halogenated $\Delta^{5,6}$-etiocholene-dione-(3,17).

22. The dihalide of $\Delta^{5,6}$-etiocholene-dione-(3,17).

23. The dibromide of $\Delta^{5,6}$-etiocholene-dione-(3,17).

24. In a process for producing an androstendione compound, the step which comprises treating an androstenolone compound having a free secondary alcohol group with an oxidizing agent capable of converting such group into a keto group.

25. In a process for producing $\Delta^{4,5}$-etiocholene-dione-(3,17), the steps which comprise reacting a dehydroandrosterone compound with an agent capable of oxidizing the hydroxy group to a keto group, and separating the $\Delta^{4,5}$-etiocholene-dione-(3,17) from the reaction product.

26. A $\Delta^{4,5}$ unsaturated polyketone of the etiocholane series having keto groups in the 3 and 17 positions.

WALTER SCHOELLER.
ARTHUR SERINI.
WILLY LOGEMANN.